(No Model.)
O. P. SOWERS.
CULTIVATOR.
No. 323,228. Patented July 28, 1885.
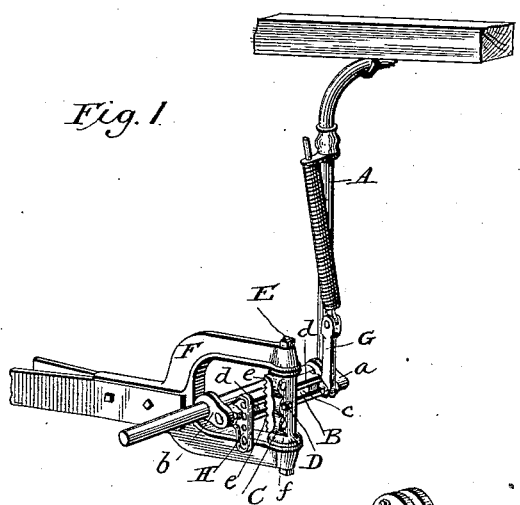
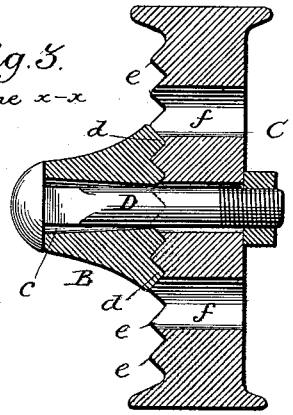
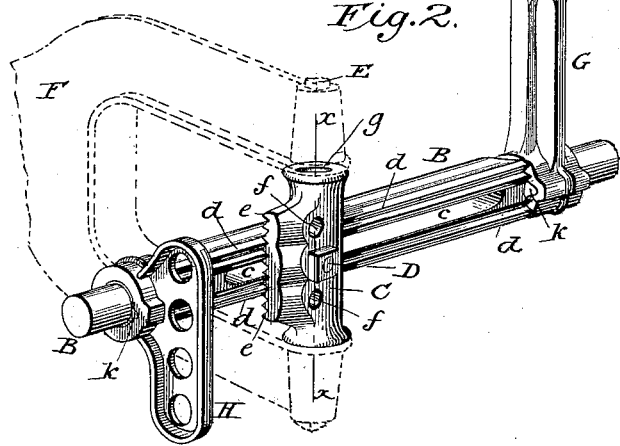
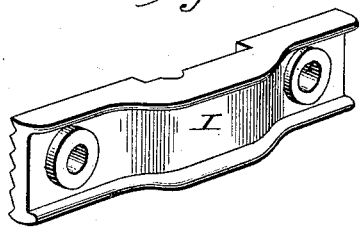
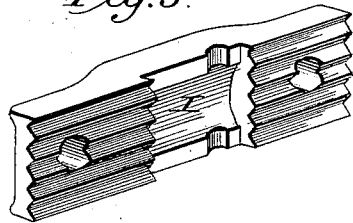
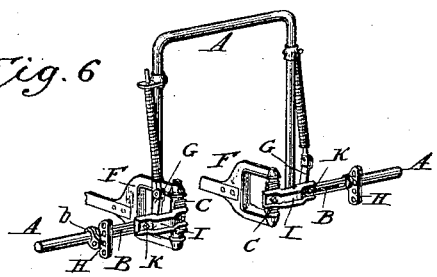
WITNESSES
Sidney P. Hollingsworth
W. H. Shipley
INVENTOR
O. P. Sowers.
By Phil. T. Dodge.
Attorney

UNITED STATES PATENT OFFICE.

OLIVER P. SOWERS, OF MOLINE, ILLINOIS, ASSIGNOR TO THE MOLINE PLOW COMPANY, OF SAME PLACE.

CULTIVATOR.

SPECIFICATION forming part of Letters Patent No. 323,228, dated July 28, 1885.

Application filed May 2, 1885. (No model.)

*To all whom it may concern:*

Be it known that I, OLIVER P. SOWERS, of Moline, in the county of Rock Island and State of Illinois, have invented certain Improvements in Cultivators, of which the following is a specification.

This invention has reference to those cultivators and similar machines in which vertically and laterally swinging beams provided with shovels are united at the forward ends by draft devices or couplings to the extremities of an axle, the central portion of which is arched or elevated, while its extremities are extended horizontally to receive the sustaining-wheels and couplings.

The invention has special reference to those machines in which springs are applied in connection with the couplings or draft devices to assist the operator in lifting the beams and shovels.

The first part of the invention is designed more especially as an improvement on the device represented in Letters Patent of the United States granted to William Evans, October 17, 1882, No. 266,123, the aim of this invention in this regard being to simplify and cheapen the apparatus, and to provide for adjusting the forward ends of the beams both laterally and vertically with greater facility, and confining them in position with increased security.

The second part of the invention is applicable not only to devices of the type above mentioned, but also to other couplings intended to permit the beams to be adjusted to run closer together than is possible in the usual machines at present known in the art; and to this end it consists in the extension of the coupling past the upright portion of the axle within the arched or curved portion, so that the beams may be attached inside of the arched portion, instead of outside, as usual.

In the accompanying drawings, Figure 1 represents a perspective view of the main axle and a portion of the usual frame-work of a cultivator with my improvements applied on the right side thereof. Fig. 2 represents, on an enlarged scale, a perspective view of my improved coupling. Fig. 3 represents a cross-section of the same on the line $x\,x$. Figs. 4 and 5 are perspective views of the removable plate or arm forming when in use the inward extension of the coupling. Fig. 6 is a perspective view showing the arched axle and so much of the coupling as is necessary to illustrate the manner of arranging the beams within the arched portion.

Referring to the drawings, A represents the main axle, the central portion of which is arched or bent upward, while the two ends are extended horizontally to receive the wheels and form supports for the coupling-head in the usual manner. Each end of the axle is provided with two perforated ears or bearings, $a$ and $b$, one near the outer extremity and the other near the arched portion, which give support to the ends of the horizontal rock-shaft B, the ends of which have suitable journals formed thereon. This shaft, which commonly lies in front of the axle, is slotted in a longitudinal direction from front to rear, as shown at $c$, and is formed in the forward face with longitudinal ribs or serrations $d$.

C represents a plate seated against the front of the rock-shaft, and provided in its rear face with transverse teeth or serrations $e$, adapted to interlock with those upon the shaft. A bolt, D, fastened through the slot $c$ and through a hole in the plate C, serves to bind the two parts firmly together and prevent their accidental movement in relation to each other. The slot in the rock-shaft admits of the bolt being moved lengthwise thereof, so that the plate C may be adjusted to or from the outer end of the axle, as occasion may require, in order to vary the distance between the shovel-beams. The plate is provided, as shown, with a number of holes, $f$, to receive the clamping-bolt D, this construction permitting the plate C to be raised and lowered upon the shaft at will, in order to vary the elevation of the forward end of the beam, and thus control the depth to which the shovels will enter the ground. The plate C is provided, as shown, with a hole, $g$, extending vertically through the same to receive a pivot-bolt, E, by means of which the clevis F or coupling, or the forward end of the shaft-beam, will be attached thereto, as shown in full lines in Fig. 1 and in dotted lines in Fig. 2.

It will be perceived that the slotted rock-shaft, the plate C, and the clevis F constitute jointly a coupling by which the beam is united to the axle, and which admits of the beam swinging both horizontally and vertically at will.

At a suitable point in its length, preferably at the inner end, the rock-shaft is provided with a rigid upright arm, G, the upper end of which is adapted, as shown, for connection with a spring-actuated rod or equivalent spring-connection to turn the coupling forward, and thereby assist in the elevation of the beam. This spring-connection constitutes no part of the present invention, but may be made of any appropriate form, that represented in the Evans patent, before alluded to, being recommended.

At its outer end the rock-shaft is provided with a vertical plate or arm, H, provided at different heights with a series of holes adapted for the connection of a draft device thereto. These holes may be arranged, as shown, above, below, and substantially on a level with the rock-shaft, so as to admit of the draft being applied to assist in the elevation or in the depression of the beams, as may be required.

In constructing my coupling I prefer to cast the axle, of malleable iron or other suitable material, with lips or ribs $k$ at its ends, and to provide the arms G and H with openings adapted to receive the ends of the axle and the lip thereon. The arms, being driven tightly upon the ends of the axle, interlock with the lips, and are thereby secured against rotation.

Passing now to the second part of the invention—the extension of the coupling inside or within the arched portion of the axle—attention is particularly directed to Figs. 4, 5, and 6, in which I represents a plate or arm adapted to be secured firmly to the inner end of the rock-shaft B, and to extend thence inward past the adjacent upright portion of the axle and receive upon its inner end the plate C. This inward extension of the coupling may be constructed in any desired form and attached to the coupling in any suitable manner, provided only that it is adapted to extend within the arched portion of the axle and permit the connection of the plow-beam to its inner end. As represented in the drawings, the plate I is serrated at its two ends and perforated to receive fastening-bolts. It is applied by seating one of its ends against the rock-shaft B and uniting it firmly thereto by a bolt, K, as shown in Fig. 6, after which the plate C is unbolted from the rock-shaft, and bolted fast to the inner end of the plate I, as shown. When the parts are thus arranged, the beams may be sustained and carried in close proximity to each other and operate inside of the arch in the same manner and with the same effect that they are commonly operated outside of the same.

While it is preferred to construct the plate or extension I in a distinct and separable piece, for the reason that it is not commonly required for use, it is to be distinctly understood that it may be cast in one piece with the rock-shaft or riveted or otherwise permanently secured to the shaft, the only requirement being that the coupling device located on the outer end of the axle outside of the arch shall be extended at one end within the arch. While I have represented this inward connection with the coupling arranged in bearings at the side of the axle, it is to be understood that it may be applied in like manner to those coupling heads or sleeves, commonly known as "pipe-boxes," which encircle the axle, so as to revolve thereon.

By the expression "arched axle" as herein employed is meant any axle or wheel-frame having its middle portion raised or elevated, and this whether constructed in one piece, as represented in the drawings, or in any of the various sectional forms at present known in the art.

I am aware that it is old to combine a rock-shaft with a beam-coupling and with a spring acting through the rock-shaft and coupling to assist in elevating the beams. The construction herein represented was designed to simplify and cheapen the machine, to avoid the difficulties incident to the constructions heretofore in use, and is the result of long practical experience in the construction and operation of this class of machines.

Having thus described my invention, what I claim is—

1. In a cultivator, the combination, with the frame or axle, of the rock-shaft mounted in bearings parallel therewith, and provided with the longitudinal slot from front to rear, the vertically and laterally adjustable plate C, to receive the plow-coupling, and the fastening-bolt D, extending through the plate and the slot in the rock-shaft, as described and shown.

2. In a cultivator-coupling, the longitudinally-slotted rock-shaft B, in combination with the plate C, having the vertical hole $g$, the fastening-bolt D, extended through the rock-shaft and plate, and the pivot-bolt E, passing through the plate C, as described and shown.

3. In a cultivator, the combination of an axle having a horizontal end and an arched central portion with a rocking coupling-head applied to the horizontal end of the shaft, and a detachable arm or plate secured to the rocking head, and extending thence inward past the raised portion of the axle, substantially as described and shown.

4. In a cultivator-coupling, the combination of the rock-shaft, the arm I and its fastening device, and the plate C and its fastening device.

5. In a cultivator having an axle with an arched or raised central portion, a rocking coupling-head extended both inside and outside of the arched portion, and adapted, substantially as described, for the attachment of the plow to either end thereof at will.

In testimony whereof I hereunto set my hand, this 4th day of March, 1885, in the presence of two attesting witnesses.

OLIVER P. SOWERS.

Witnesses:
 W. EVANS,
 A. W. WAY.